US010623289B1

(12) United States Patent
McCorkendale et al.

(10) Patent No.: US 10,623,289 B1
(45) Date of Patent: Apr. 14, 2020

(54) SYSTEMS AND METHODS FOR DETECTING NONFUNCTIONAL ENDPOINT DEVICES

(71) Applicant: Symantec Corporation, Mountain View, CA (US)

(72) Inventors: Bruce McCorkendale, Manhattan Beach, CA (US); William E. Sobel, Jamul, CA (US)

(73) Assignee: NortonLifeLock Inc., Tempe, AZ (US)

( * ) Notice: Subject to any disclaimer, the term of this patent is extended or adjusted under 35 U.S.C. 154(b) by 542 days.

(21) Appl. No.: 15/279,061

(22) Filed: Sep. 28, 2016

(51) Int. Cl.
*H04L 12/26* (2006.01)
*H04L 12/24* (2006.01)
*H04L 29/08* (2006.01)

(52) U.S. Cl.
CPC .......... *H04L 43/0817* (2013.01); *H04L 41/12* (2013.01); *H04L 67/303* (2013.01)

(58) Field of Classification Search
CPC ... H04L 43/0817; H04L 67/303; H04L 41/12; H04L 12/26; H04L 29/08; H04L 12/24
USPC ........ 709/224, 223; 370/252, 254; 340/16.1; 714/39, 47.1–47.3
See application file for complete search history.

(56) References Cited

U.S. PATENT DOCUMENTS

| 9,571,640 | B1 | 2/2017 | Chen et al. | |
| 2015/0373043 | A1* | 12/2015 | Wang | G06F 21/6254 706/12 |
| 2016/0285717 | A1* | 9/2016 | Kim | H04L 12/2803 |
| 2017/0208079 | A1* | 7/2017 | Cammarota | H04L 63/10 |
| 2017/0223052 | A1* | 8/2017 | Stutz | H04L 63/1416 |
| 2017/0359306 | A1* | 12/2017 | Thomas | H04L 63/10 |

OTHER PUBLICATIONS

Carey Nachenberg; Systems and Methods for Handling Fraudulent Uses of Brands; U.S. Appl. No. 14/469,571, filed Aug. 26, 2014.
Ilya Sokolov et al.; Systems and Methods for Detecting Anomalous Behaviors of Limited-Purpose Devices; U.S. Appl. No. 14/645,892, filed Mar. 12, 2015.

(Continued)

*Primary Examiner* — Tonia L Dollinger
*Assistant Examiner* — Mehulkumar J Shah
(74) *Attorney, Agent, or Firm* — FisherBroyles,LLP (57) ABSTRACT

The disclosed computer-implemented method for detecting nonfunctional endpoint devices may include (i) identifying, at a networking device, an endpoint device, (ii) identifying, at the networking device, a behavioral profile of the endpoint device that may include (a) a functional pattern of network behavior of the endpoint device that occurs while the endpoint device is in a functional state and/or (b) a nonfunctional pattern of network behavior of the endpoint device that occurs while the endpoint device is in a nonfunctional state, (iii) passively monitoring, at the networking device, network traffic of the endpoint device, (iv) determining, at the networking device, that the endpoint device is nonfunctional by detecting (a) an absence of the functional pattern in the network traffic and/or (b) a presence of the nonfunctional pattern in the network traffic, and (v) performing a security action. Various other methods, systems, and computer-readable media are also disclosed.

20 Claims, 6 Drawing Sheets

(56) References Cited

OTHER PUBLICATIONS

Srinivas Chillappa et al.; Router Based Securing of Internet of Things Devices on Local Area Networks; U.S. Appl. No. 14/747,896, filed Jun. 23, 2015.
Srinivas Chillappa et al.; Router Based Securing of Internet of Things Devices on Local Area Networks; Application No. PCT/US2016/035571; Filed Jun. 2, 2016.
Fanglu Guo; Systems and Methods for Connecting Purpose-Built Appliances to Secure Wireless Networks; U.S. Appl. No. 14/640,015, filed Mar. 5, 2015.
Bruce McCorkendale; Systems and Methods for Authenticating Users; U.S. Appl. No. 14/834,949, filed Aug. 25, 2015.
Udit Gupta; Monitoring in IOT enabled devices; Jul. 2015.

* cited by examiner

SYSTEMS AND METHODS FOR DETECTING NONFUNCTIONAL ENDPOINT DEVICES

BACKGROUND

The term "Internet of Things" (IoT) generally refers to a local network of physical objects or "things" equipped with computing hardware and software that enable the physical objects to connect to the local network and run computer instructions. Household items such as smart thermostats, lightbulbs, vents, and appliances, as well as sensor-equipped wearable devices, are a few examples of currently popular IoT devices. New IoT devices are rapidly becoming available and adopted by household users. By the year 2017, the average number of connected devices per household is projected to grow to 25 devices, and to 50 devices by the year 2020.

IoT devices are in fact networked devices, albeit typically with relatively low amounts of storage, memory, power supply and processing capability, and frequently with no display. As a result of (i) the number of IoT devices that are expected to be present in most households and/or (2) the limited functions provided by the typical IoT device, many homeowners may not frequently manage or interface with each of their IoT devices. As a result, many IoT devices or the software running on these devices may enter a nonfunctional state without a homeowner's knowledge because of such things as a need for an update or an associated subscription having expired. Moreover, some IoT devices may be of a type that are typically set up and forgotten while others may run multiple subscription services (e.g. an antivirus service), which may increase the difficulty for homeowners to monitor and track the health status of the endpoint devices within their home networks. The instant disclosure, therefore, identifies and addresses a need for systems and methods for detecting nonfunctional endpoint devices.

SUMMARY

As will be described in greater detail below, the instant disclosure describes various systems and methods for detecting nonfunctional endpoint devices. In one example, a method for detecting nonfunctional endpoint devices may include (i) identifying, at a networking device (e.g., a home router), an endpoint device (e.g., an IoT device) that is in a functional state and transmits network traffic through the networking device, (ii) identifying, at the networking device, a behavioral profile of the endpoint device that may include (a) a functional pattern of network behavior of the endpoint device that occurs (e.g., repeatedly) while the endpoint device is in the functional state and/or (b) a nonfunctional pattern of network behavior of the endpoint device that occurs while the endpoint device is in a nonfunctional state, (iii) passively monitoring, at the networking device, the network traffic of the endpoint device, (iv) determining, at the networking device while passively monitoring the network traffic of the endpoint device, that the endpoint device is nonfunctional by detecting (a) an absence of the functional pattern in the network traffic of the endpoint device and/or (b) a presence of the nonfunctional pattern in the network traffic of the endpoint device, and (v) performing, at the networking device, a security action based at least in part on determining that the endpoint device is nonfunctional.

In some examples, the functional pattern may be (i) a periodic communication with a remote update server that manages updates for the endpoint device, (ii) a periodic communication with a remote licensing server that manages a license for the endpoint device, or (iii) a periodic communication with a remote telemetry server that stores telemetry data for the endpoint device. In some examples, the step of identifying the behavioral profile of the endpoint device may include (i) passively monitoring, at the networking device during a learning period, the network traffic of the endpoint device and (ii) discovering, during the learning period, the functional pattern of network behavior of the endpoint device in the network traffic of the endpoint device.

In some examples, the step of identifying the behavioral profile of the endpoint device may include (i) passively monitoring, at the networking device during a learning period, the network traffic of the endpoint device that is directed to a specific remote server and (ii) discovering, during the learning period, the functional pattern of network behavior of the endpoint device in the network traffic of the endpoint device that is directed to the specific remote server. In various examples, the specific remote server may include an update server, a license server, or a telemetry server.

In some examples, the networking device, the endpoint device, and an additional endpoint device may be a part of a local network. In at least one example, the step of identifying the behavioral profile of the endpoint device may include (i) passively monitoring, at the networking device during a learning period, the network traffic of the endpoint device that is directed to the additional endpoint device and (ii) discovering, during the learning period, the functional pattern of network behavior of the endpoint device in the network traffic of the endpoint device that is directed to the additional endpoint device.

In some examples, the networking device and the endpoint device may be a part of a local network, an additional networking device and an additional endpoint device may be a part of an additional local network, the additional endpoint device may transmit network traffic through the additional networking device, and the endpoint device and the additional endpoint device may be of the same type. In such examples, the computer-implemented method may further include (i) passively collecting, at the additional networking device, information about the network traffic of the additional endpoint device, (ii) receiving, by a server-side system from the additional networking device, the information about the network traffic of the additional endpoint device, (iii) analyzing, at the server-side system, the information about the network traffic of the additional endpoint device to identify the functional pattern, and (iv) including the functional pattern in the behavioral profile of the endpoint device. In at least one of these examples, the step of identifying the behavioral profile of the endpoint device may include receiving the behavioral profile from the server-side system. In various examples, the step of performing the security action may include (i) notifying a user of the endpoint device of the endpoint device being in the nonfunctional state, (ii) performing a remediation action to return the endpoint device to the functional state, and/or (iii) quarantining the endpoint device.

In one embodiment, a system for detecting nonfunctional endpoint devices may include several modules stored in memory, including (i) a device-identifying module that identifies, at a networking device, an endpoint device that is in a functional state and transmits network traffic through the networking device, (ii) a profile-identifying module that identifies, at the networking device, a behavioral profile of the endpoint device that may include (a) a functional pattern of network behavior of the endpoint device that occurs while the endpoint device is in the functional state and/or (b) a nonfunctional pattern of network behavior of the endpoint device that occurs while the endpoint device is in a nonfunctional state, (iii) a monitoring module that passively monitors, at the networking device, the network traffic of the endpoint device, (iv) a detecting module that determines, at the networking device while passively monitoring the network traffic of the endpoint device, that the endpoint device is nonfunctional by detecting (a) an absence of the functional pattern in the network traffic of the endpoint device and/or (b) a presence of the nonfunctional pattern in the network traffic of the endpoint device, and (v) a security module that performs, at the networking device, a security action based at least in part on determining that the endpoint device is nonfunctional. The system may also include at least one physical processor that executes the device-identifying module, the profile-identifying module, the monitoring module, the detecting module, and the security module.

In some examples, the above-described method may be encoded as computer-readable instructions on a non-transitory computer-readable medium. For example, a computer-readable medium may include one or more computer-executable instructions that, when executed by at least one processor of a networking device, cause the networking device to (i) identify, at the networking device, an endpoint device that is in a functional state and transmits network traffic through the networking device, (ii) identify, at the networking device, a behavioral profile of the endpoint device that may include (a) a functional pattern of network behavior of the endpoint device that occurs while the endpoint device is in the functional state and/or (b) a nonfunctional pattern of network behavior of the endpoint device that occurs while the endpoint device is in a nonfunctional state, (iii) passively monitor, at the networking device, the network traffic of the endpoint device, (iv) determine, at the networking device while passively monitoring the network traffic of the endpoint device, that the endpoint device is nonfunctional by detecting (a) an absence of the functional pattern in the network traffic of the endpoint device and/or (b) a presence of the nonfunctional pattern in the network traffic of the endpoint device, and (v) perform, at the networking device, a security action based at least in part on determining that the endpoint device is nonfunctional.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting nonfunctional endpoint devices. As will be explained in greater detail below, by passively monitoring, at a networking device in a local network, network traffic for (i) the absence of functional patterns (e.g., patterns of an endpoint device's network behavior that reliably occur in the endpoint device's network traffic while the endpoint device is in a functional state) and/or the presence of nonfunctional patterns (e.g., patterns of an endpoint device's network behavior that are expected to occur in the endpoint device's network traffic when the endpoint device is in a nonfunctional state), the systems and methods described herein may enable the detection, monitoring, and/or management of nonfunctional endpoint devices within the local network. Furthermore, in some examples, by enabling the detection, monitoring, and management of nonfunctional endpoint devices within a local network, these systems and methods may enable an administrator of a large number of endpoint devices (e.g., a homeowner whose home network includes a large number of IoT devices) to monitor and manage the endpoint devices from a single location rather than requiring the administrator to monitor and manage the endpoint devices individually, which may be especially helpful when the administrator does not often interact with the endpoint devices and/or the endpoint devices do not provide the administrator with a way to easily monitor and/or manage them.

In addition, the systems and methods described herein may improve the functioning of a computing device by detecting when the computing device enters a nonfunctional state thus improving the likelihood that the computing device will return to a functional state. These systems and methods may also improve the fields of endpoint management, network management, and/or network security by detecting nonfunctional endpoint devices. Embodiments of the instant disclosure may also provide various other advantages and features, as discussed in greater detail below.

Figure 1:
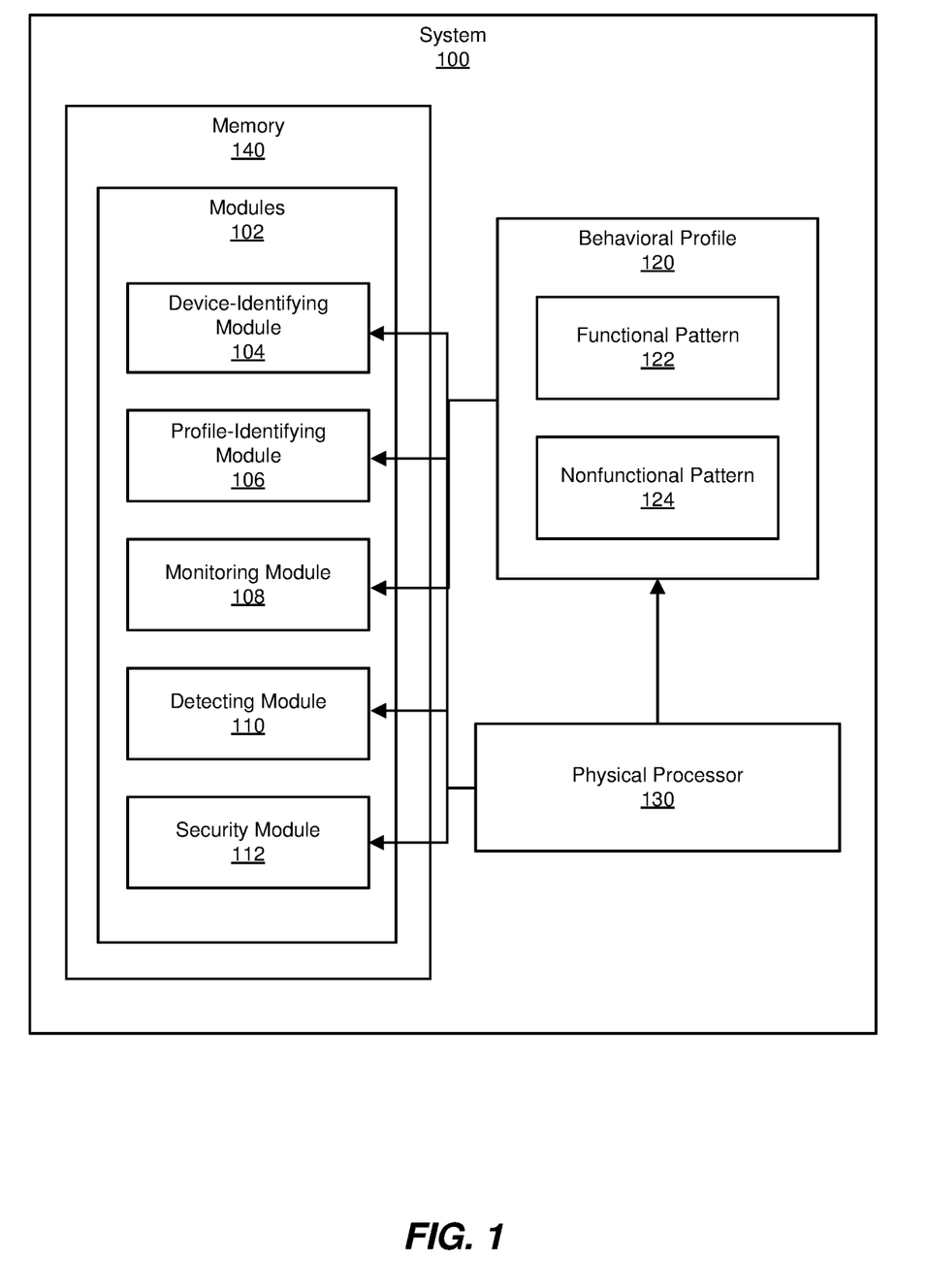
FIG. 1 is a block diagram of an example system for detecting nonfunctional endpoint devices.
Figure 2:
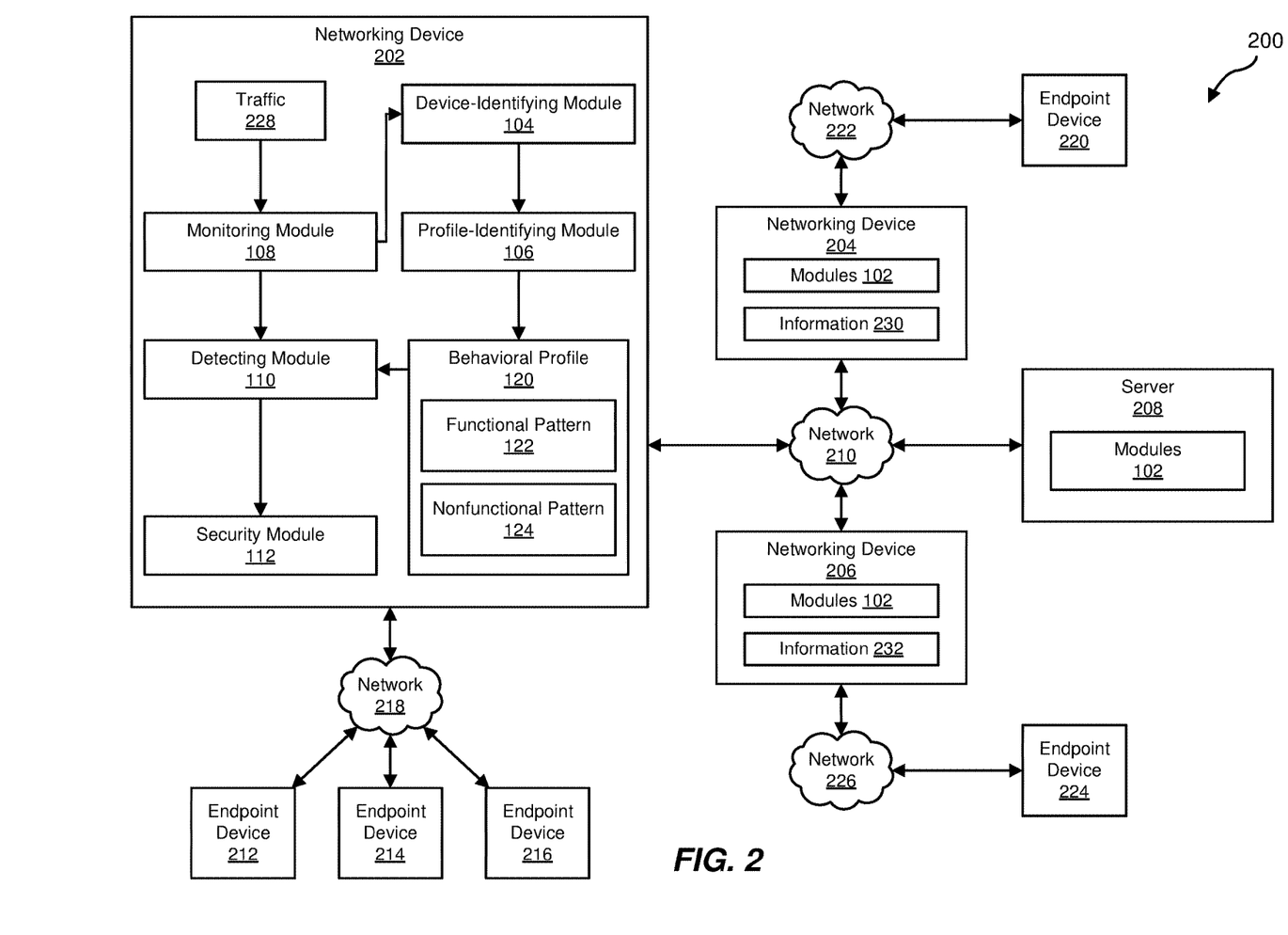
FIG. 2 is a block diagram of an additional example system for detecting nonfunctional endpoint devices.

The following will provide, with reference to FIGS. 1-2, detailed descriptions of example systems for detecting nonfunctional endpoint devices. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of an example system 100 for detecting nonfunctional endpoint devices. As illustrated in this figure, example system 100 may include one or more modules 102 for performing one or more tasks. As will be explained in greater detail below, modules 102 may include a device-identifying module 104, a profile-identifying module 106, a monitoring module 108, a detecting module 110, and a security module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., networking device 202 and/or server 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting nonfunctional endpoint devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more behavioral profiles, such as behavioral profile 120. Behavioral profile 120 generally represents any type or form of representation of the typical network behaviors of an endpoint device or a type of endpoint device. In some examples, a behavioral profile of an endpoint device may include patterns that may be present within the endpoint device's network traffic when the endpoint device is in certain functional or nonfunctional states. For example, behavioral profile 120 may include one or more functional patterns (such as a functional pattern 122) and one or more nonfunctional patterns (such as a nonfunctional pattern 124).

Figure 4:
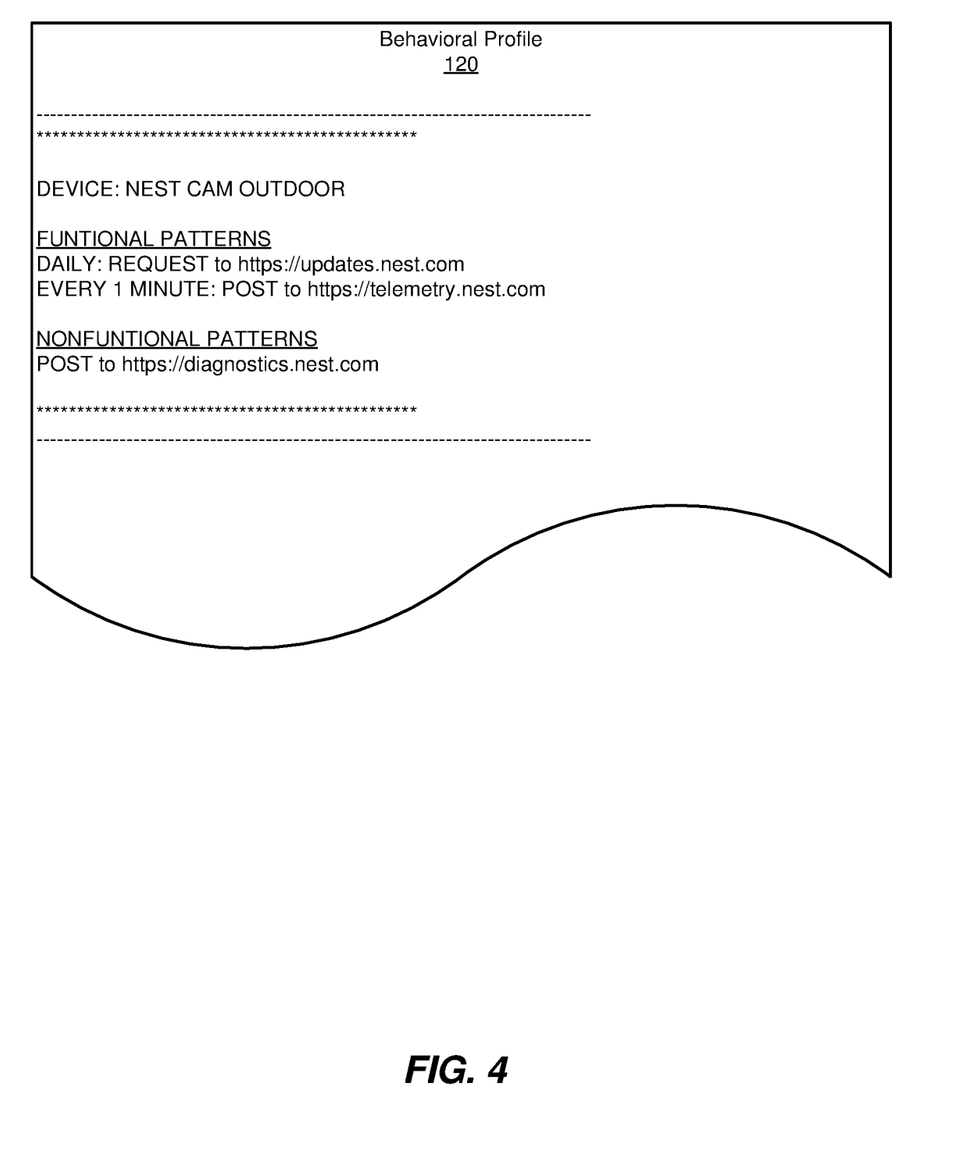
FIG. 4 is a block diagram of an example behavioral profile.

Functional pattern 122 generally represents any type or form of representation (e.g., a signature or fingerprint) of a pattern of network behavior of an endpoint device that occurs while the endpoint device is in a functional state. In some examples, functional pattern 122 may be a pattern that is reliably or predictably repeated in the endpoint device's network traffic. Additional examples of functional pattern 122 include, without limitation, periodic requests for information, periodic requests for update information (e.g., a request that is used to determine whether an endpoint device is up-to-date), periodic requests for license information (e.g., access tokens or keys that enable an endpoint device to run licensed software), periodic heartbeat messages, periodic pings, periodic transmissions of telemetry data, periodic transmissions of usage or analytics data (e.g., data that indicates how an endpoint device is used), periodic transmissions of data to a known remote update server that manages updates for the endpoint device, periodic transmissions of data to a known remote licensing server that manages a license for the endpoint device, periodic transmissions of data to a known remote telemetry server that stores telemetry data for the endpoint device, periodic transmissions of data to one or more other devices within the same local network (e.g., periodic requests for data and/or periodic responses). FIG. 4 illustrates an example behavioral profile 120. In this example, behavioral profile 120 includes two example functional patterns. As shown, the first example functional pattern may include a daily request to "https://updates.nest.com" and a post request to "https://telemetry.nest.com" that has been observed to occur repeatedly every minute.

Nonfunctional pattern 124 generally represents any type or form of representation of a pattern of network behavior of an endpoint device that occurs while the endpoint device is in a nonfunctional state. Examples of nonfunctional pattern 124 include, without limitation, a transmission of an error or failure code, a transmission of an error or failure message, and a transmission of data to a particular known remote diagnostic server. FIG. 4 illustrates an example behavioral profile 120. In this example, behavioral profile 120 includes one example nonfunctional pattern. As shown, the example nonfunctional pattern may include a post request to "https://diagnostics.nest.com."

Example system 100 in FIG. 1 may be implemented in a variety of ways. For example, all or a portion of example system 100 may represent portions of example system 200 in FIG. 2. As shown in FIG. 2, system 200 may include a networking device 202, a networking device 204, a networking device 206, and a server 208 in communication via a network 210. In one example, all or a portion of the functionality of modules 102 may be performed by networking device 202, networking device 204, networking device 206, server 208, and/or any other suitable computing system. As will be described in greater detail below, one or more of modules 102 from FIG. 1 may, when executed by at least one processor of networking device 202, networking device 204, networking device 206, and/or server 208, enable networking device 202, networking device 204, networking device 206, and/or server 208 to detect nonfunctional endpoint devices.

Networking devices 202, 204, and 206 generally represent any type or form of networking device capable of reading computer-executable instructions and/or any device through which network traffic may be transmitted to or from an endpoint device (e.g., endpoint device 212). Examples of networking device 202 include, without limitation, residential gateways, modems, wireless access points, network gateways, Internet gateways, network routers, email gateways, network firewalls, proxy servers, any network component of a communications service provider, or any other suitable computing device. In some examples, each of networking devices 202, 204, and 206 may represent a router within a different home that is used to connect one or more IoT devices within a local network of the home to each other and/or the Internet. For example, networking device 202 may represent a router within a home that is used to connect endpoint devices 212, 214, and 216 within a local network 212 of the home to each other and/or network 210. Similarly, networking device 204 may represent another router within another home that is used to connect endpoint device 220 to network 210, and networking device 206 may represent yet another router within yet another home that is used to connect an endpoint device 224 to network 210. In at least one example, endpoint devices 209, 220, and 224 may represent the same type of endpoint device (e.g., endpoint devices that share the same make and model number and/or endpoint devices that run the same version of the same software).

Endpoint devices 212, 214, 216, 220, and 224 generally represent any type or form of computing device that is capable of connecting to a network and/or any combination of components (e.g., service or firmware components) of such a device. In some examples, endpoint devices 212, 214, 216, 220, and 224 may include devices described as "smart devices," "Internet-of-Things devices," and/or "smart appliances." Such devices may be purpose-built appliances that have limited functionality when compared to a more general-purpose computer. Examples of endpoint devices 212, 214, 216, 220, and 224 include, without limitation, thermostats (e.g. the NEST thermostat), toasters, refrigerators, cameras, speakers, televisions, printers, lights, electronic locks, intercoms, ovens, microwaves, door openers, media servers, scales, cameras, physical security systems, embedded devices, a garage door sensor, a house-door sensor, a light sensor, a light-switch sensor, a motion detector, a window sensor, a humidity sensor, a sound sensor and/or any other appropriate networked device.

Endpoint devices may be in various functional or nonfunctional states during their lifetimes. As used herein, the term "functional state" and/or the term "functional" generally refers to any state or configuration of an endpoint device and/or a service running on the endpoint device in which the endpoint device and/or the service is operating properly, correctly, and as desired. An endpoint device may be considered functional or in a functional state if it is properly performing the tasks for which the endpoint device was designed. In some examples, the term "functional state" and/or the term "functional" may refer to a state of an endpoint device in which the endpoint device is up-to-date, is secured (e.g., the endpoint device includes working security software), has current subscriptions, or has current licenses.

As used herein, the term "nonfunctional state" and/or the term "nonfunctional" generally refers to any state or configuration of an endpoint device in which the endpoint device is not operating properly, correctly, or as desired. An endpoint device may be considered nonfunctional or in a nonfunctional state if it is not properly performing the tasks for which the endpoint device was designed. In some examples, the term "nonfunctional state" and/or the term "nonfunctional" may refer to a state in which the endpoint device has failed or malfunctioned and/or a state in which the endpoint device is not up-to-date, is not secured, has subscriptions or licenses that have expired, and/or has had software services (e.g., security software) disabled or uninstalled.

Server 208 generally represents any type or form of networking device that is capable of reading computer-executable instructions. In some examples, server 208 may represent a central server at which information about endpoint devices' typical or expected network behaviors may be collected from a large number of networking devices and analyzed for functional patterns and/or nonfunctional patterns. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 208 may include and/or represent a plurality of servers that work and/or operate in conjunction with one another.

Network 210 generally represents any medium or architecture capable of facilitating communication or data transfer. In one example, network 210 may facilitate communication between networking device 202, networking device 204, networking device 206, and server 208. In this example, network 210 may facilitate communication or data transfer using wireless and/or wired connections. Examples of network 210 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Local networks 218, 222, and 226 generally represent any medium or architecture capable of facilitating communication or data transfer. Examples of local networks 218, 222, and 226 include a Local Area Network (LAN), a Personal Area Network (PAN), a private network, a virtual private network, a WIFI network, a BLUETOOTH network, a BLUETOOTH LOW ENERGY network, a ZIGBEE network, a 6LOWPAN network, a WIRELESSHART network, a Z-WAVE network, a THREAD network, a Near Field Communication (NFC) network, a Sub-1 GHz network, and/or any other type or form of local, secure, and/or private network.

Figure 3:
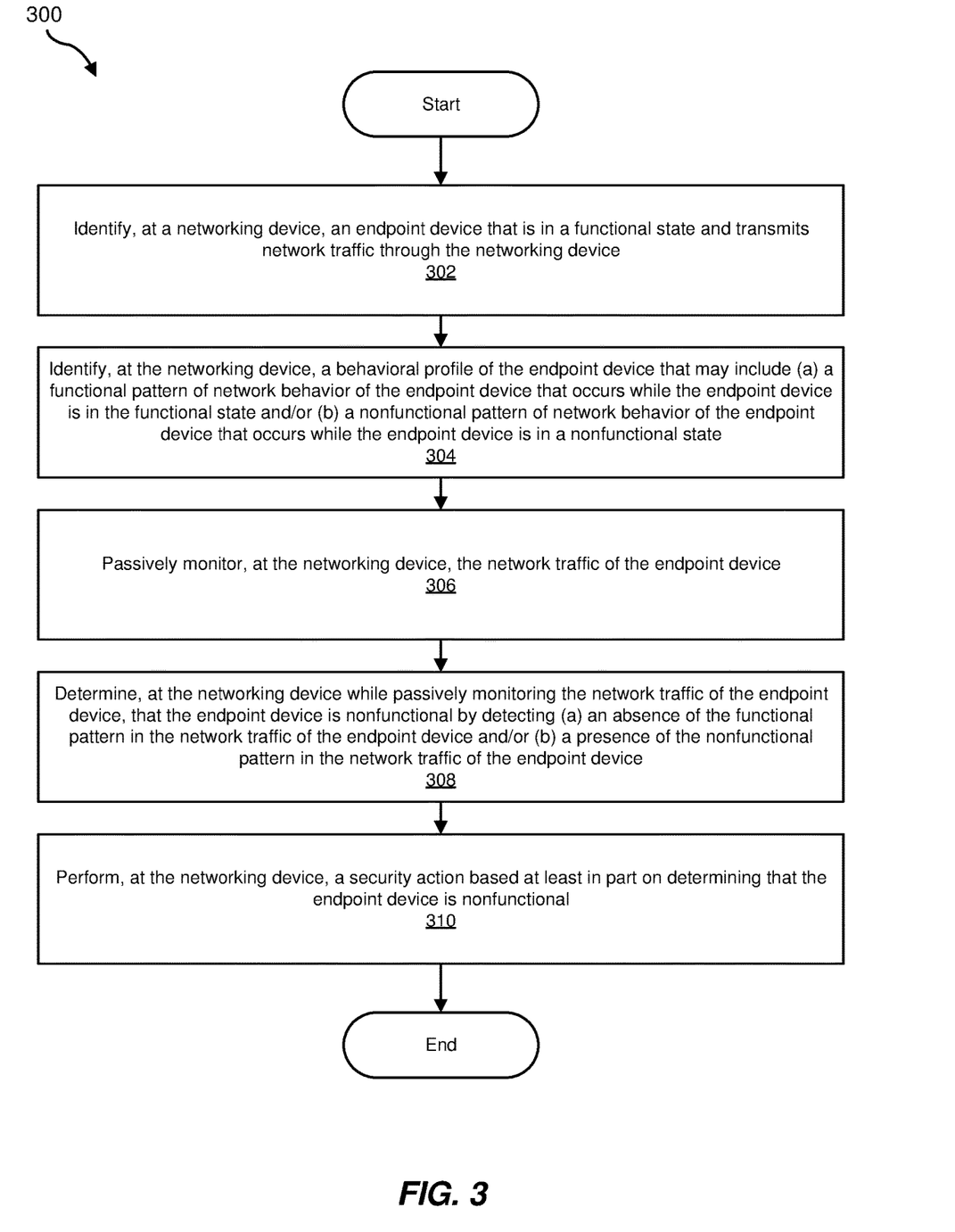
FIG. 3 is a flow diagram of an example method for detecting nonfunctional endpoint devices.

FIG. 3 is a flow diagram of an example computer-implemented method 300 for detecting nonfunctional endpoint devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify, at a networking device, an endpoint device that is in a functional state and transmits network traffic through the networking device. For example, device-identifying module 104 may, as part of networking device 202 in FIG. 2, identify endpoint device 212 that is in a functional state and that transmits network traffic 228 through networking device 202.

The systems described herein may perform step 302 in any suitable manner. In some examples, device-identifying module 104 may identify an endpoint device by passively identifying one or more features (e.g., previously fingerprinted features) in the endpoint device's network traffic (e.g., network traffic that originates from and/or is addressed to the endpoint device) that distinguishes the endpoint device's network traffic from the network traffic of other endpoint devices. For example, device-identifying module 104 may identify an endpoint device based on the content of the endpoint device's network traffic, the timing of the network traffic, the frequency of the network traffic, the amount of the network traffic, the source and destinations of the network traffic, the protocols used in the network traffic, and/or any other characteristics of the network traffic.

At step 304, one or more of the systems described herein may identify, at the networking device, a behavioral profile of the endpoint device that may include (a) a functional pattern of network behavior of the endpoint device that occurs while the endpoint device is in the functional state and/or (b) a nonfunctional pattern of network behavior of the endpoint device that occurs while the endpoint device is in a nonfunctional state. For example, profile-identifying module 106 may, as part of networking device 202 in FIG. 2, identify behavioral profile 120 of endpoint device 212.

The systems described herein may perform step 304 in any suitable manner. In one example, profile-identifying module 106 may identify a behavioral profile of an endpoint device by passively profiling, while the endpoint device is or is likely to be in a functional state, the network traffic of the endpoint device to detect functional patterns in the network traffic. For example, profile-identifying module 106 may passively monitor, during an initial training phase (e.g., a predetermined period of time after an endpoint device is initially encountered), an endpoint device's network traffic for predictable patterns in the content of the endpoint device's network traffic, the timing of the network traffic, the source and destinations of the network traffic, the protocols used in the network traffic, and/or any other characteristics of the network traffic.

In some examples, profile-identifying module 106 may identify a behavioral profile of an endpoint device by receiving the behavioral profile from a remote service that maintains the behavioral profile. For example, profile-identifying module 106 may receive a behavioral profile from a remote service that (i) collects, from many networking devices that each are part of a different local network, information about the real-world network behaviors of a particular type of endpoint device that is encountered by the networking devices, (ii) analyzes the collected information for functional and/or nonfunctional patterns, (iii) generates a behavioral profile for the particular type of endpoint device that includes any functional and/or nonfunctional patterns that are detected, and (iv) distributes the behavioral profiles to the networking devices for use in detecting nonfunctional endpoint devices. Using FIG. 2 as an example, server 208 may (i) collect, from networking devices 204 and 206, information 230 and information 232 about the real-world network behaviors of endpoint devices 220 and 224, (ii) analyze information 230 and information 232 for functional and/or nonfunctional patterns, (iii) generate behavioral profile 120 for endpoint devices that are of the same type as endpoint devices 220 and 224 that includes functional pattern 122 and/or nonfunctional pattern 124, and (iv) distribute behavioral profile 120 to networking device 202 for use in detecting nonfunctional endpoint devices within local network 218.

At step 306, one or more of the systems described herein may passively monitor, at the networking device, the network traffic of the endpoint device. For example, monitoring module 108 may, as part of networking device 202 in FIG. 2, passively monitor network traffic 228 of endpoint device 212. The systems described herein may passively and transparently monitor the network traffic of an endpoint device in any suitable manner that enables the detection of functional or nonfunctional patterns in the network traffic.

At step 308, one or more of the systems described herein may determine, at the networking device while passively monitoring the network traffic of the endpoint device, that the endpoint device is nonfunctional by detecting (a) an absence of the functional pattern in the network traffic of the endpoint device and/or (b) a presence of the nonfunctional pattern in the network traffic of the endpoint device. For example, detecting module 110 may, as part of networking device 202 in FIG. 2, determine that endpoint device 212 is nonfunctional by detecting (a) an absence of functional pattern 122 in network traffic 228 and/or (b) a presence of nonfunctional pattern 124 in network traffic 228.

The systems described herein may perform step 308 in any suitable manner. In some examples, detecting module 110 may determine that an endpoint device is nonfunctional by detecting a sudden absence of a previously reliable functional pattern in the network traffic of the endpoint device. For example, detecting module 110 may determine that a subscription of an endpoint device has expired by detecting when the endpoint device stops querying for available updates. In other examples, detecting module 110 may determine that an endpoint device is nonfunctional by detecting the absence of previously reliable periodic requests for information, the absence of previously reliable periodic requests for update information, the absence of previously reliable periodic heartbeat messages, the absence of previously reliable periodic pings, the absence of previously reliable periodic transmissions of telemetry data, the absence of previously reliable periodic transmissions of usage or analytics data, the absence of previously reliable periodic transmissions of data to known remote servers, and/or the absence of previously reliable periodic transmissions of data to one or more other devices within the same local network.

Additionally or alternatively, detecting module 110 may determine that an endpoint device is nonfunctional by detecting a sudden presence of a known nonfunctional pattern in the network traffic of the endpoint device. For example, detecting module 110 may determine that a subscription or a license of an endpoint device has expired by detecting when the endpoint device stops querying for available updates and/or begins communicating only with its known licensing server. In other examples, detecting module 110 may determine that an endpoint device is nonfunctional by detecting a transmission of an error or failure code, a transmission of an error or failure message, and/or a transmission of data to a particular known remote diagnostic server.

At step 310, one or more of the systems described herein may perform, at the networking device, a security action based at least in part on determining that the endpoint device is nonfunctional. For example, security module 112 may, as part of networking device 202 in FIG. 2, perform a security action based on determining that endpoint device 212 is nonfunctional.

The systems described herein may perform step 310 in any suitable manner. In one example, in response to a determination that an endpoint device is nonfunctional, security module 112 may notify a user of the determination and/or recommend a solution to restore the endpoint device to a functional state. For example, in response to a determination that a subscription of an endpoint device has expired, security module 112 may notify a user of the expired subscription and/or provide a method to the user to renew the subscription. Similarly, in response to a determination that an endpoint device is not up-to-date, security module 112 may notify a user and/or provide a method to the user to update the endpoint device. Likewise, in response to a determination that an endpoint device has irreparably malfunctioned, security module 112 may notify a user and/or suggest replacing the endpoint device.

In some situations, a nonfunctional state of an endpoint device may endanger the security of a local network. For example, an endpoint device that is not up-to-date may have security vulnerabilities. Similarly, an endpoint device that includes security software whose license has expired may become less secure. In situations like these, security module 112 may, in response to determining that an endpoint device is in a nonfunctional state, quarantine the endpoint device. Upon completion of step 310, exemplary method 300 in FIG. 3 may terminate.

As explained above, by passively monitoring, at a networking device in a local network, network traffic for (i) the absence of functional patterns (e.g., patterns of an endpoint device's network behavior that reliably occur in the endpoint device's network traffic while the endpoint device is in a functional state) and/or the presence of nonfunctional patterns (e.g., patterns of an endpoint device's network behavior that are expected to occur in the endpoint device's network traffic when the endpoint device is in a nonfunctional state), the systems and methods described herein may enable the detection, monitoring, and/or management of nonfunctional endpoint devices within the local network. Furthermore, in some examples, by enabling the detection, monitoring, and management of nonfunctional endpoint devices within a local network, these systems and methods may enable an administrator of a large number of endpoint devices (e.g., a homeowner whose home network includes a large number of IoT devices) to monitor and manage the endpoint devices from a single location rather than requiring the administrator to monitor and manage the endpoint devices individually, which may be especially helpful when the administrator does not often interact with the endpoint devices and/or the endpoint devices do not provide the administrator with a way to easily monitor and/or manage them.

Figure 5:
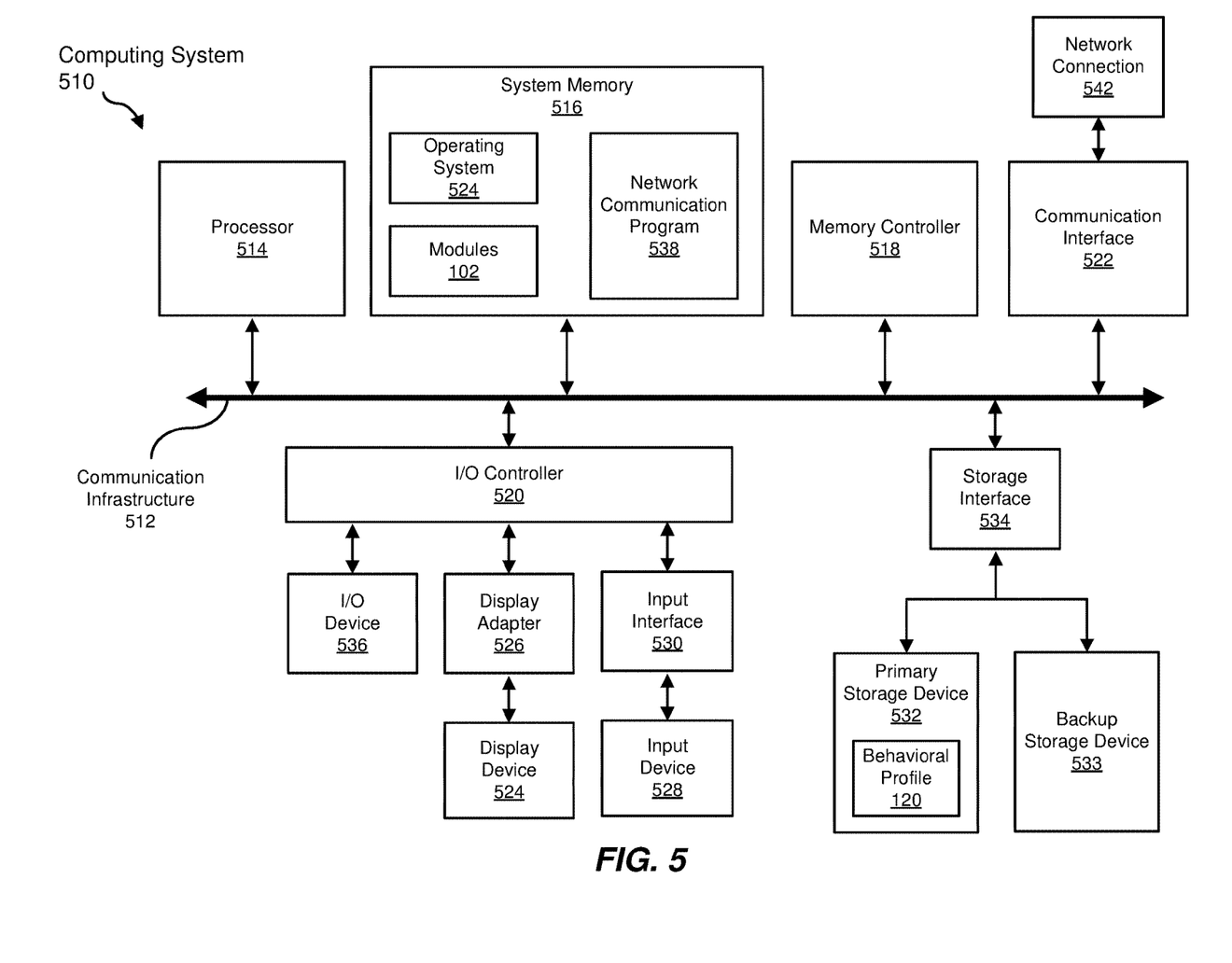
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, behavioral profile 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
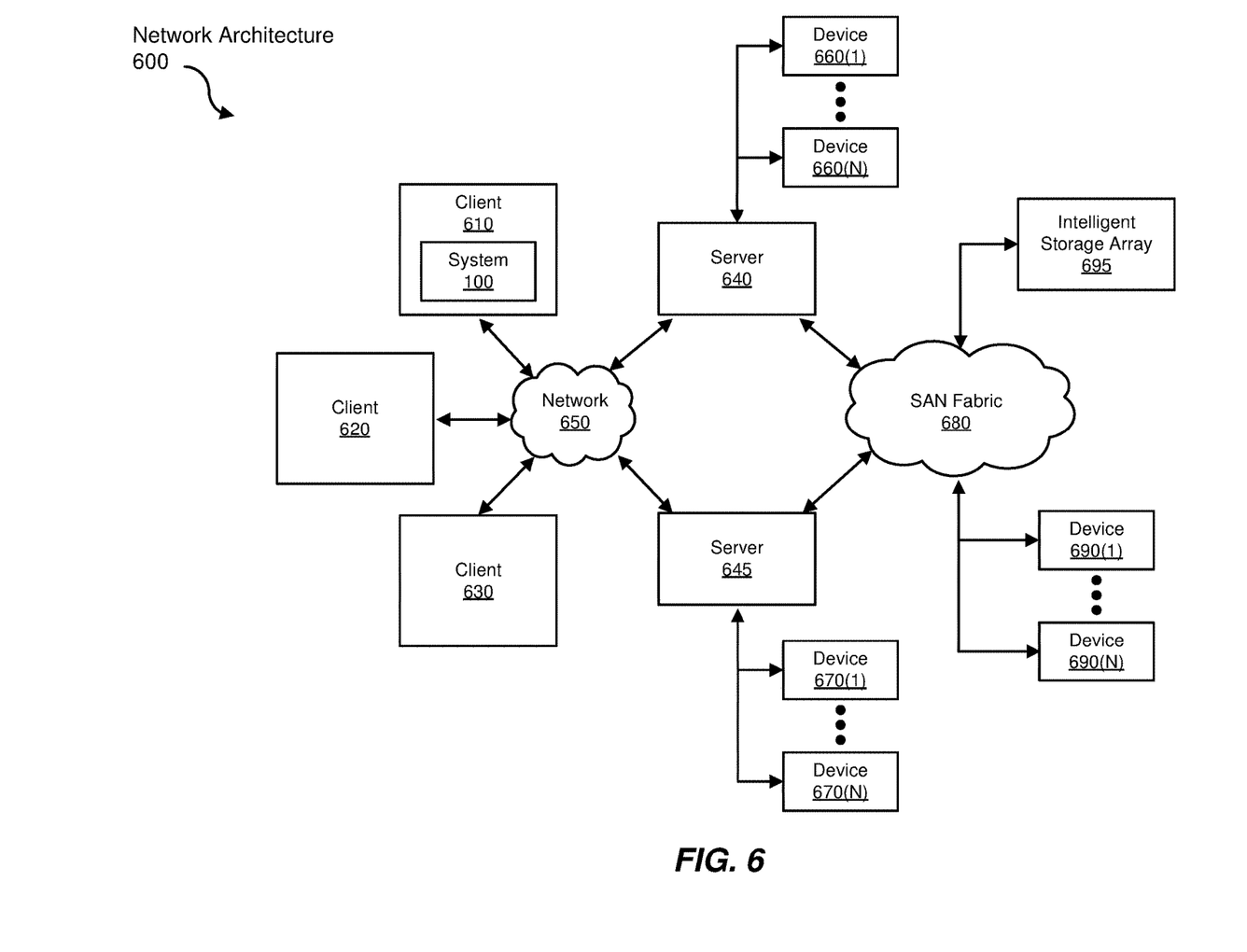
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting nonfunctional endpoint devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants).

One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive network traffic from an endpoint device to be transformed, transform the network traffic into a behavioral profile for detecting nonfunctional endpoint devices, output a result of the transformation to a networking device, use the result of the transformation to detect a nonfunctional endpoint device, and store the result of the transformation to a system for storing network profiles. In another example, one or more of the modules recited herein may receive network traffic from an endpoint device to be transformed, transform the network traffic into a detection of the endpoint device entering a nonfunctional state, output a result of the transformation to a reporting system, use the result of the transformation to notify a user of the endpoint device entering the nonfunctional state, and store the result of the transformation to a system for storing information about nonfunctional endpoint devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting nonfunctional endpoint devices, at least a portion of the method being performed by a server-side system comprising at least one processor, the method comprising:
    passively monitoring, at a plurality of networking devices during a learning period, network traffic of a plurality of endpoint devices that is directed to a specific remote server, wherein:
        each of the plurality of endpoint devices are of a type of endpoint device;
        each of the plurality of networking devices are part of a different local network;
        the specific remote server comprises at least one of:
            an update server;
            a licensing server; and
            a telemetry server;
    receiving, at the server-side system from the plurality of networking devices during the learning period, information about the network traffic of the plurality of endpoint devices;
    analyzing, at the server-side system, the information about the network traffic of the plurality of endpoint devices to passively discover, during the learning period, a behavioral profile for the type of endpoint device that comprises at least one of:
        a known functional pattern of network behavior that occurs while endpoint devices of the type are in a known functional state, the known functional state comprising one or more of:
            an up-to-date state in which available software updates have been applied;
            a secured state in which security software is operable;
            a subscribed state in which subscriptions services are operable; and
            a licensed state in which licenses are current; and
        a known nonfunctional pattern of network behavior that occurs while endpoint devices of the type are in a known nonfunctional state, the known nonfunctional state comprising one or more of:
            an out-of-date state in which available software updates have not been applied;
            an unsecured state in which security software is not operable;
            an unsubscribed state in which subscriptions services are not operable; and
            an unlicensed state in which licenses have expired;
    receiving, at an additional networking device, the behavioral profile from the server-side system;
    identifying, at the additional networking device, at least one additional endpoint device of the type that transmits network traffic through the additional networking device;
    passively monitoring, at the additional networking device, the network traffic of the additional endpoint device;
    determining, at the additional networking device while passively monitoring the network traffic of the additional endpoint device, that the additional endpoint device is in the known nonfunctional state by detecting at least one of:
        an absence of the known functional pattern in the network traffic of the additional endpoint device; and
        a presence of the known nonfunctional pattern in the network traffic of the additional endpoint device; and
    performing a security action based at least in part on determining that the additional endpoint device is in the known nonfunctional state.

2. The computer-implemented method of claim 1, wherein:
    the additional networking device comprises a network router; and
    the additional endpoint device comprises an internet-of-things device.

3. The computer-implemented method of claim 1, wherein:
    the known functional state comprises the subscribed state; and
    the known nonfunctional state comprises the unsubscribed state.

4. The computer-implemented method of claim 1, wherein:
    the known functional state comprises the secured state; and
    the known nonfunctional state comprises the unsecured state.

5. The computer-implemented method of claim 1, wherein:
    the known functional state comprises the up-to-date state; and
    the known functional pattern comprises a periodic communication with the update server that manages updates for the plurality of endpoint devices and the additional endpoint device.

6. The computer-implemented method of claim 1, wherein:
    the known functional state comprises the licensed state; and
    the known functional pattern comprises a periodic communication with the licensing server that manages a license for the additional endpoint device.

7. The computer-implemented method of claim 1, wherein:
    the known functional state comprises the secured state; and
    the known functional pattern comprises a periodic communication with the telemetry server that stores telemetry data for the plurality of endpoint devices and the additional endpoint device.

8. The computer-implemented method of claim 1, wherein:
    the known nonfunctional state comprises the unsecured state; and
    performing the security action comprises quarantining the additional endpoint device.

9. The computer-implemented method of claim 1, wherein performing the security action comprises providing a method to a user of the additional networking device to perform at least one of:
- apply an available software update to the additional endpoint device;
- renew a subscriptions service of the additional endpoint device; and
- renew a license of the additional endpoint device.

10. The computer-implemented method of claim 1, further comprising:
- passively monitoring, at each of the plurality of networking devices during the learning period, local network traffic of an associated one of the plurality of endpoint devices that is directed to a local endpoint device;
- receiving, at the server-side system from each of the plurality of networking devices during the learning period, information about the local network traffic of the associated one of the plurality of endpoint devices;
- analyzing, at the server-side system, the information about the local network traffic of the plurality of endpoint devices to passively discover, during the learning period, an additional known functional pattern of network behavior or an additional known nonfunctional pattern of network behavior for the type of endpoint device.

11. The computer-implemented method of claim 1, wherein performing the security action comprises performing a remediation action to return the additional endpoint device to the known functional state.

12. The computer-implemented method of claim 1, wherein performing the security action comprises notifying a user of the additional endpoint device of the endpoint device being in the known nonfunctional state.

13. A system for detecting nonfunctional endpoint devices, the system comprising:
- a first profile-identifying module, stored in memory, that passively monitors, at a plurality of networking devices during a learning period, network traffic of a plurality of endpoint devices that is directed to a specific remote server, wherein:
  - each of the plurality of endpoint devices are of a type of endpoint device;
  - each of the plurality of networking devices are part of a different local network;
  - the specific remote server comprises at least one of:
    - an update server;
    - a licensing server; and
    - a telemetry server;
- a second profile-identifying module, stored in memory, that:
  - receives, at a server-side system from the plurality of networking devices during the learning period, information about the network traffic of the plurality of endpoint devices;
  - analyzes, at the server-side system, the information about the network traffic of the plurality of endpoint devices to passively discover, during the learning period, a behavioral profile for the type of endpoint device that comprises at least one of:
    - a known functional pattern of network behavior that occurs while endpoint devices of the type are in a known functional state, the known functional state comprising one or more of:
      - an up-to-date state in which available software updates have been applied;
      - a secured state in which security software is operable;
      - a subscribed state in which subscriptions services are operable; and
      - a licensed state in which licenses are current; and
    - a known nonfunctional pattern of network behavior that occurs while endpoint devices of the type are in a known nonfunctional state, the known nonfunctional state comprising one or more of:
      - an out-of-date state in which available software updates have not been applied;
      - an unsecured state in which security software is not operable;
      - an unsubscribed state in which subscriptions services are not operable; and
      - an unlicensed state in which licenses have expired;
- a third profile-identifying module, stored in memory, that receives, at an additional networking device, the behavioral profile from the server-side system;
- a device-identifying module, stored in memory, that identifies, at the additional networking device, at least one additional endpoint device that transmits network traffic through the additional networking device;
- a monitoring module, stored in memory, that passively monitors, at the additional networking device, the network traffic of the additional endpoint device;
- a detecting module, stored in memory, that determines, at the additional networking device while passively monitoring the network traffic of the additional endpoint device, that the additional endpoint device is in the known nonfunctional state by detecting at least one of:
  - an absence of the known functional pattern in the network traffic of the additional endpoint device; and
  - a presence of the known nonfunctional pattern in the network traffic of the additional endpoint device;
- a security module, stored in memory, that performs a security action based at least in part on determining that the additional endpoint device is in the known nonfunctional state;
- at least one physical processor that executes the device-identifying module, the first profile-identifying module, the second profile-identifying module, the third profile-identifying module, the monitoring module, the detecting module, and the security module.

14. The system of claim 13, wherein:
the additional networking device comprises a network router; and
the additional endpoint device comprises an internet-of-things device.

15. The system of claim 13, wherein:
the known functional state comprises the subscribed state; and
the known nonfunctional state comprises the unsubscribed state.

16. The system of claim 13, wherein:
the known functional state comprises the secured state; and
the known nonfunctional state comprises the unsecured state.

17. The system of claim 13, wherein:
the known functional state comprises the up-to-date state; and
the known functional pattern comprises at least one of:
- a periodic communication with the update server that manages updates for the plurality of endpoint devices and the additional endpoint device; and a periodic communication with the telemetry server that stores telemetry data for the plurality of endpoint devices and the additional endpoint device.

18. The system of claim 13, wherein:
the known functional state comprises the secured state;
the known functional pattern comprises a periodic communication with the telemetry server that stores telemetry data for the plurality of endpoint devices and the additional endpoint device.

19. The system of claim 13, wherein the security module performs the security action by performing at least one of:
notifying a user of the additional endpoint device of the additional endpoint device being in the known nonfunctional state;
performing a remediation action to return the additional endpoint device to the known functional state; and
quarantining the additional endpoint device.

20. A non-transitory computer-readable medium comprising one or more computer-executable instructions that, when executed by at least one processor of a networking device, a plurality of additional networking devices, and a server-side system, cause the networking device, the plurality of additional networking devices, or the server-side system to:
passively monitor, at the plurality of additional networking devices during a learning period, network traffic of a plurality of endpoint devices that is directed to a specific remote server, wherein:
each of the plurality of endpoint devices are of a type of endpoint device;
each of the plurality of additional networking devices are part of a different local network;
the specific remote server comprises at least one of:
an update server;
a licensing server; and
a telemetry server;
receive, at the server-side system from the plurality of additional networking devices during the learning period, information about the network traffic of the plurality of endpoint devices;
analyze, at the server-side system, the information about the network traffic of the plurality of endpoint devices to passively discover, during the learning period, a behavioral profile for the type of endpoint device that comprises at least one of:
a known functional pattern of network behavior that occurs while endpoint devices of the type are in a known functional state, the known functional state comprising one or more of:
an up-to-date state in which available software updates have been applied;
a secured state in which security software is operable;
a subscribed state in which subscriptions services are operable; and
a licensed state in which licenses are current; and
a known nonfunctional pattern of network behavior that occurs while endpoint devices of the type are in a known nonfunctional state, the known nonfunctional state comprising one or more of:
an out-of-date state in which available software updates have not been applied;
an unsecured state in which security software is not operable;
an unsubscribed state in which subscriptions services are not operable; and
an unlicensed state in which licenses have expired;
receive, at the networking device, the behavioral profile from the server-side system;
identify, at the networking device, at least one additional endpoint device of the type that transmits network traffic through the networking device;
passively monitor, at the networking device, the network traffic of the additional endpoint device;
determine, at the networking device while passively monitoring the network traffic of the additional endpoint device, that the additional endpoint device is in the known nonfunctional state by detecting at least one of:
an absence of the known functional pattern in the network traffic of the endpoint additional device; and
a presence of the known nonfunctional pattern in the network traffic of the additional endpoint device; and
perform a security action based at least in part on determining that the additional endpoint device is in the known nonfunctional state.

* * * * *